(12) United States Patent
McLeod et al.

(10) Patent No.: US 8,190,837 B2
(45) Date of Patent: May 29, 2012

(54) SEQUENTIAL HARD DISK DATA STORAGE METHOD AND SYSTEM

(75) Inventors: Alastair Campbell McLeod, Ayr (GB); Chris Sprucefield, Ayr (GB)

(73) Assignee: Veracity UK Limited (GB)

( * ) Notice: Subject to any disclaimer, the term of this patent is extended or adjusted under 35 U.S.C. 154(b) by 562 days.

(21) Appl. No.: 12/294,597

(22) PCT Filed: Mar. 12, 2007

(86) PCT No.: PCT/GB2007/000857
§ 371 (c)(1),
(2), (4) Date: Aug. 11, 2009

(87) PCT Pub. No.: WO2007/110577
PCT Pub. Date: Oct. 4, 2007

(65) Prior Publication Data
US 2009/0310242 A1    Dec. 17, 2009

Related U.S. Application Data

(60) Provisional application No. 60/786,364, filed on Mar. 28, 2006.

(51) Int. Cl.
*G06F 12/16* (2006.01)
(52) U.S. Cl. .................. 711/162; 711/114; 711/150
(58) Field of Classification Search .................. None
See application file for complete search history.

(56) References Cited

U.S. PATENT DOCUMENTS

| | | | |
|---|---|---|---|
| 6,583,947 B1 | 6/2003 | Hakamata | |
| 2002/0034379 A1* | 3/2002 | Tanaka | 386/125 |
| 2005/0240691 A1 | 10/2005 | Yurusov | |

FOREIGN PATENT DOCUMENTS

| | | | |
|---|---|---|---|
| EP | 0748121 A2 | | 11/1996 |
| EP | 0917376 A2 | | 5/1999 |
| EP | 1178390 A2 | | 6/2002 |
| GB | 2410098 A | | 7/2005 |
| GB | 2410345 A | | 7/2005 |
| JP | 2005-63591 | | 3/2005 |
| WO | 97/01139 A | | 1/1997 |
| WO | WO97/01139 | * | 1/1997 |

OTHER PUBLICATIONS

"Sun Fire 280R Server Owner's Guide" [Online] Jan. 2001, pp. Cover-XXVIII, 87-90, XP002439011, Palo Alto, CA, USA, Retrieved from the Internet: URL:http://www.sun.com/products-n-solutions/hardware/docs/pdf/806-4806-10.pdf [retrieved on Jun. 19, 2007] p. 88, paragraph 1-p. 89, last paragraph.

* cited by examiner

*Primary Examiner* — Than Nguyen
(74) *Attorney, Agent, or Firm* — Workman Nydegger

(57) ABSTRACT

An improved method and apparatus for data storage on hard disk drives (HDD) is described. The method and apparatus employ sequential data recording techniques ideal for sequential recording applications thus enabling the production of cheaper, more reliable and conveniently accessible systems. The sequential recording method may be employed with arrays of low-cost HDD and/or with the sequential employment of sectors, or groups of sectors, located within the individual HDDs themselves. An important feature of the system is that data are never deleted and so is only ever lost when overwritten with new data. Particular embodiments of the invention describe mirrored data storage systems which also provide for protection against data loss should one or more data storage elements fail.

10 Claims, 11 Drawing Sheets

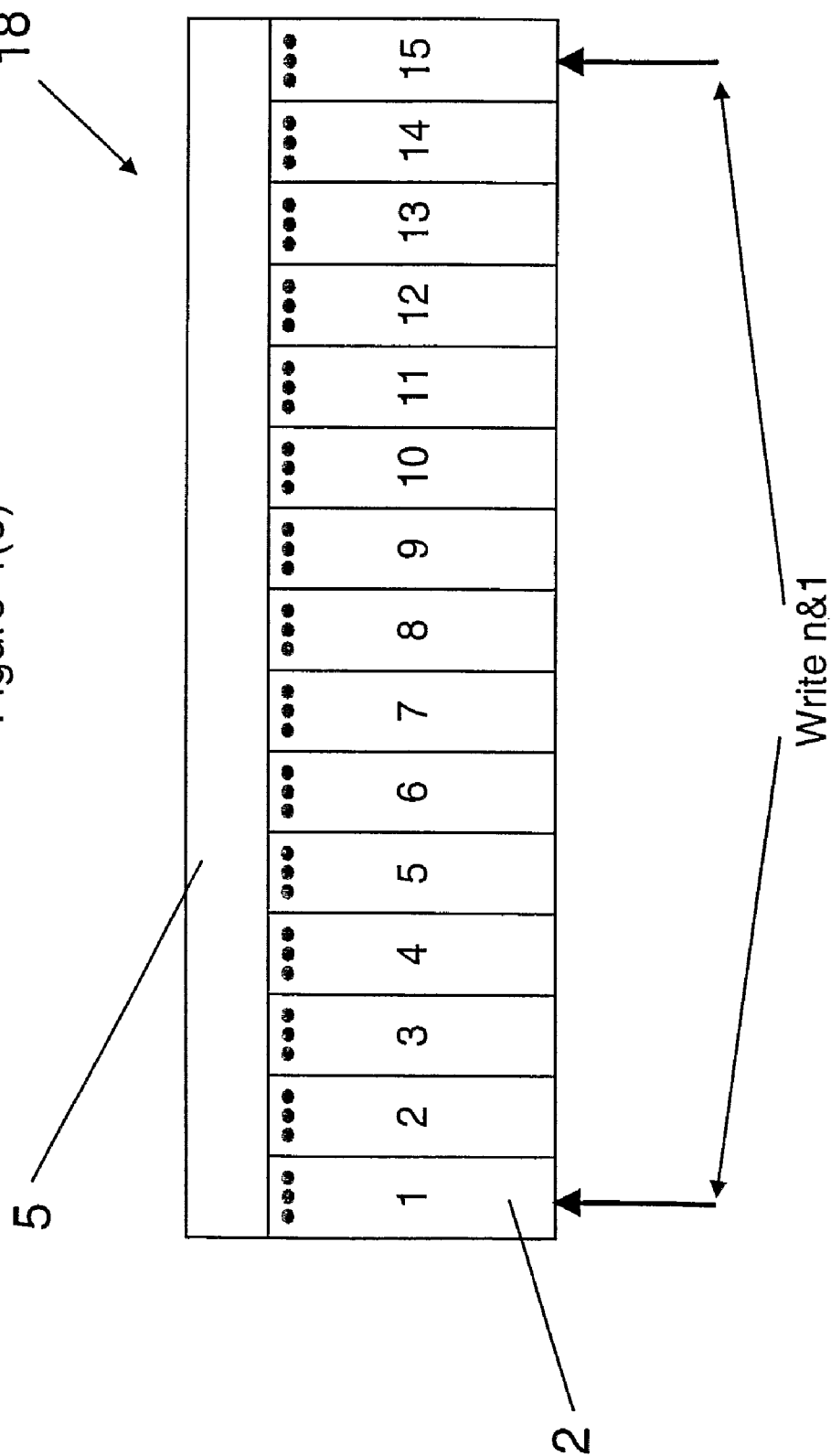

SEQUENTIAL HARD DISK DATA STORAGE METHOD AND SYSTEM

The present invention relates to the field of data storage systems and in particular to an improved method and apparatus for data storage on hard disk drives [HDD] that employs sequential data recording techniques for sequential recording applications.

Modern hard disk drives are generally very reliable for typical data storage applications. In recent years however, data-intensive storage applications such as digital video recording [DVR] systems have taken advantage of the speed and capacity of HDDs for storage of video, audio and other data generated on a strictly sequential basis.

These data-intensive applications stress HDDs to their limit such that the occurrence of disk failure events have become more common, if not inevitable, so much so in fact, that it is generally accepted by those skilled in the art that the HDD is the weakest point in the reliability of any larger disk-based data storage system.

In order to mitigate the problem of disk failure events when the volume of data generated by the recording processes is large, and/or the required storage period (before overwriting, if any) is extended, then arrays of HDDs are typically employed to store the data. When quantities of HDDs are employed, the likelihood of a drive failure occurring is increased in direct proportion to the number of drives present.

As the recorded data can be of critical importance, various redundant or fault-tolerant disk array schemes developed for the general IT industry (e.g. RAID1, RAID5, etc.) are exploited for larger storage requirements in order to improve the overall reliability of the total system.

Although the actual design of HDD systems can be very sophisticated the basic concept is very simple. One or more stacked spinning platters of recording surfaces (magnetic material) are addressed by an equal number of stacked read/write heads on a moving arm which can rotate across the full span of the recording area (much like the pickup arm of an old-fashioned record player). The position of the moving arm relative to an associated spinning platter is controlled by an arm actuator (magnet & coil).

Due to the data densities and speeds involved, the positioning accuracy required for the recording heads is extreme. For example, in order for a moving arm to reach the read/write point quickly, the arm actuator is designed to rapidly accelerate and decelerate the arm. Although the arm and read/write head assembly are designed to have as low a mass as possible, the rapid accelerations involved require significant energy, and this energy is generally dissipated as heat within the actuator assembly. It is for this reason that a HDD which is continuously reading/writing (with the arm constantly skipping back and forth from the directory(s) to the data areas) will run much hotter than a HDD which is running without any read/write activity.

For the reasons outlined above the interface electronics of HDD systems known in the art are typically designed to be very robust and hence in practice rarely fail. However, the HDDs often fail when the physical surface of the platter becomes damaged or contaminated. This can result from a head touching the platter surface due to shock or vibration, or when the positioning accuracy of the read/write arm degrades due to shock, vibration or general wear and tear. It is known that high temperatures also shorten the life of a HDD and that continuous arm movement also acts to wear out the actuator. Therefore, the positioning accuracy of the arm eventually decreases to an extent where the HDD becomes more prone to errors. This is found to be most prevalent during the write cycle.

Vibration, over-heating and wear and tear are the root causes of eventual HDD failure. Thus, the higher the levels of vibration (in operation) and the higher the operating temperatures, the shorter the mean-time between failures [MTBF] for any given HDD. These factors are recognised by most HDD manufacturers who therefore provide graphs showing the expected MTBF as it varies with operating temperature. Typically these show an exponential increase in drive failure rates with increasing operating temperature, especially for lower-cost HDDs.

It is also appreciated by those skilled in the art that most HDD failures (i.e. unrecoverable loss of data) occur during write processes, as writing data involves actively changing the magnetic state of the recording surface, both in writing the data itself and in updating the file directory of the HDD. The file directory is where an index to the locations of all parts of all the files on the disk is kept. As this directory is written to most often, this is the area of the HDD most susceptible to failure. Unfortunately a serious error in the file directory can cause a catastrophic loss of data as this is the index to the physical locations of the data files all over the HDD. Typically, all the files in the data area of the HDD are fragmented, and therefore recovery of these files can be impossible, or very difficult, at least without the use of specialist HDD data recovery services. Such services are both expensive and highly inconvenient, especially when the data may be legally, commercially, officially or otherwise sensitive, or where access to the data is required as quickly as possible.

By comparison, it is appreciated by those skilled in the art that merely reading data from a HDD is a relatively passive procedure as the recording surface is left in an unaltered state (although a head crash i.e. the head touching the platter due to external shock or vibration, can still cause a loss of data).

Conventional solutions for providing high data integrity with HDD systems involve the use of HDD arrays (such as a Redundant Array of Inexpensive Disks [RAID]) with some form of redundancy e.g. mirroring, parity schemes etc. For example, enterprise-level DVR storage systems typically employ RAID 5 systems where an array of n HDDs provides an effective array of n-1 HDDs, as parity data from each HDD is spread across all the other drives in a defined pattern. In the event of a failure, the RAID 5 controller regenerates the data on the failed HDD onto a new HDD from the parity data on all the other surviving HDDs.

The problem with this particular scheme is that reconstruction of the lost data on the new HDD is processor and HDD-intensive, as well as being somewhat complex. In real-time recording applications, it is further complicated by the need to carry on writing new data (across ALL of the HDDs, including the new one) whilst simultaneously reconstructing the lost data.

For large HDDs, (i.e. those of the order of hundreds of GB) the reconstruction process can take many hours. During this whole period the drive array is under considerably increased read/write stress, especially if the incoming data streams (for recording) are of a high-bandwidth. The fundamental problem here is that if another HDD happens to fail during this process (or indeed before the failed drive is replaced) then all of the data across the entire array will be lost. This event is referred to as a catastrophic data loss. As a result, RAID 5 systems are particularly unsuited for data-intensive applications (such as are found in DVR systems) due to the constant high-bandwidth data streams generated by such applications (e.g. video, audio, real-time instrumentation data etc.). It is noted by the authors that despite this fact, RAID 5 systems are often specified for such applications, most probably due to a lack of any other cost-effective fault-tolerant solution.

An alternative option known in the art is the mirrored drive array option (RAID 1). This is more attractive from a data integrity point of view, but by definition, is twice as expensive. In RAID 1 systems the same data is written to two HDDs (or two arrays) simultaneously. Reconstruction of a failed HDD is relatively straightforward as the surviving HDD of a matched pair is simply copied to a new HDD which replaces the failed HDD. However, this again puts the surviving HDD under much more stress as it has to read all the data across to the new HDD and at the same time continue to record new data.

A general problem of all of the disk array systems known in the art is that for reasons of cost, space and accessibility, the HDDs are normally packed tightly together and front-mounted for easy removal. A typical 19" rack disk array may contain up to 15 drives vertically mounted and stacked in a horizontal manner. This scheme is very common, and although there are many variations of vertical and horizontal mountings, the general result is the same. All the drives are constantly running (and normally data are written across the drives in a scattered fashion) and so the heat dissipation in one HDD will serve to increase the temperature of the immediately surrounding HDD. Thus, in practice, an array of 15 closely-mounted drives can get very hot indeed. Forced cooling of such an array is then employed. Such cooling requires many fans (and a source of cooled incoming air and thus often expensive air-conditioning) and is often inefficient due to restricted airflow around the packed HDDs. As noted previously, there is normally an exponential increase in failure rates as the operating temperature of the HDDs increases.

Another inherent problem with the known HDD arrays is that the vibration of one HDD (due to the drive motor and rapid movement of the read/write arms) will be transmitted to the other drives, thus increasing wear and tear, so reducing the MTBF of each individual HDD. This effect is compounded when all the drives are writing at the same time, as is typical with most data-intensive filing systems and is essential with most RAID schemes, including RAID 5.

In addition to the problems of temperature and vibration, HDD arrays exhibit heavy power consumption. As an example, a 15-disk array, dissipating 12 W per disk, with a 400 W PSU running at 75% effficiency (and therefore dissipating 75 W itself, cooling fans using 25 W, and control electronics (usually a PC motherboard and very fast processor for complex RAID control) using 100 W, totals 380 W. This represents a significant power usage with a high running cost, especially when such arrays are used 24 hrs per day, 365 days per year and the costs of the air-conditioning required to cool equipment rooms are taken into account.

A yet further problem of the prior art systems are the effects of power outages and power variations. Mains power variations can affect HDD reliability. Mains power spikes particularly can cause over-voltages in the DC output side of the controller power supply unit [PSU] and can either damage the HDD electronics or cause data errors during writing processes. Furthermore, brown-outs (low voltages), surges (over voltages) and momentary losses (drop-outs) of power can all have unpredictable effects on the system electronics. Experience with the installation of thousands of disk storage systems over many different types of industrial and commercial sites shows that mains power problems may not have an immediate effect on HDD reliability, but over time the effects of spikes, brown outs and surges will reduce the HDD lifetime and eventually produce HDD failures. The HDDs are most sensitive to power supply problems when they are writing data as any variations may corrupt the data, or cause control errors, but may not permanently affect anything else in the HDD system. Thus, the exposure of HDDs to power supply problems are exacerbated in applications such as video or audio recording (or indeed continuous data recording of any type) as they involve the continuous writing of data, and thus the HDDs are always writing.

As a result of the effects of power outages and power variations, most IT equipment (including enterprise-level disk arrays) tend to employ uninterruptible power supply [UPS] units, which greatly add to the overall system costs. In practice it is found that true line-interactive UPS units must be employed as these condition and filter the mains power whereas cheaper units do not.

HDD manufacturers are aware of many of the above outlined problems encountered by their products in various applications. As a result they offer a range of HDD products, with different operating and performance characteristics. Naturally, the more robust the HDD (e.g. higher duty-cycle designs, tolerance to vibration or high operating temperature), the higher the price. At the top end of the range, HDD manufacturers produce so-called enterprise performance HDDs, which are reasonably robust against common failure modes. However, such drives are very expensive and are thus only used for so-called critical online storage (where data writing speeds and high performance are essential). These drives also tend to consume more power and run hotter. Even so, these high-performance drives still exhibit decreased MTBF with increased operating temperatures and vibrations. Further, for mass-storage applications (such as video/audio recording or IT archive and backup purposes), these disks are so expensive that a solution using many enterprise HDDs is often totally impractical.

In summary, the prior-art HDD arrays suffer from a number of problems including temperature, vibration, cooling, power consumption, constant exposure to power supply variations and cost. Other than using forced cooling or more expensive disks, the prior-art solutions to these problems generally employ techniques designed solely to cope with HDD failure, rather than addressing the fundamental reasons why HDDs fail in the first place. They therefore employ a technical approach which copes with the symptoms but does not attempt to provide a cure.

It is therefore an object of the present invention to provide a cheaper, more reliable and more convenient HDD system for the storage of data that employs one or more sequential data recording techniques. Such sequential recording may be through the sequential employment of arrays of low-cost HDD and/or the sequential employment of sectors, or groups of sectors, located within the individual HDDs themselves.

SUMMARY OF INVENTION

According to a first aspect of the present invention there is provided a method of storing data on a hard disk drive system, comprising the steps of:
1) selecting a first data storage element from an array of sequentially arranged data storage elements;
2) recording data within the first data storage element until the first data storage element is filled to capacity;
3) selecting a sequentially next data storage element from the array of sequentially arranged data storage elements;
4) recording data within the sequentially next data storage element until the sequentially next data storage element is filled to capacity; and 5) repeating steps 3 and 4 until a predetermined number of the sequentially arranged data storage elements of the array have been filled to capacity.

The above method of storing data on a hard disk drive system is particularly suited for recording data generated on a strictly sequential time basis, which may or may not be continuous, and which may or may not vary in data rate. Examples of data generated on a strictly sequential time basis include video and audio recordings, real-time instrumentation data, archive data or data transferred during a full backup process. Sequentially generated data are not necessarily constant or continuous. An example of a non-constant data rate is digital video recording where the image rate, image quality and number of image channels may all vary with time. Examples of non-continuous data generation include an instrumentation system generating data triggered by external events, such as seismic monitoring and digital video recording system which records to a fixed or variable schedule, or perhaps is triggered by video motion detection or other sensors.

Most preferably the method of storing data further comprises repeating steps 1 to 5 once the predetermined number of the sequentially arranged data storage elements of the array have been filled to capacity.

Importantly it should be noted that by employing this method, data are never deleted and is only ever lost when it is overwritten with new data. This is an essential feature of any data storage system intended to record evidential data. Overwriting of data occurs only when the storage capacity of the full data array has been reached and the writing point loops back to the starting point. The total data volume stored on the system at any point will directly correspond to a time span during which that data was generated, as it is written and stored sequentially. The storage period of the system will therefore depend on the total capacity of the system and the volume of data generated during that period. Alternatively, a shorter storage period may be imposed on the system if required by prematurely setting the writing point back to the initial starting point after the required storage period has been reached. This might be used, for example, where local legislation or guidelines for storing certain types of data have set time limits.

Preferably the data storage elements comprise hard disk drives.

Most preferably the first data storage element comprises a first group of two or more sequentially arranged hard disk drives. With such an arrangement the hard disk drives of the first group simultaneously record the same data.

Preferably the sequentially next data storage element comprises a second group of two or more hard disk drives wherein the sequential numbering of the hard disk drives of the second group is offset by at least one from the sequential numbering of the hard disk drives of the previous group. This arrangement provides a mirrored data storage system so as to protect against data loss if one or more of the hard disk drives were to fail during the write process.

Most preferably the method further comprises selecting the sequentially next data storage element in response to the failure of a hard disk drive within which data is being recorded. Thus, as a result of a failure of one of the hard disk drives the next available working data storage element is immediately selected, so minimising the opportunity for data loss.

Most preferably the step of selecting the sequentially next data storage element comprises powering up one or more hard disk drives.

Most preferably the method of storing data further comprises the step of powering down one or more hard disk drives once the data storage element capacity is reached.

The powering down of the hard disk drives offers the significant advantages that each particular hard disk drive is only in operation for a fraction of the storage period of the array of hard disk drives. As a result the detrimental effects of vibration, heat dissipation and wear and tear are significantly reduced thus reducing the risk of a hard disk drive failure event occurring.

Alternatively the data storage elements comprise allocation blocks of disk sectors located within the hard disk drive. Preferably an allocation block comprises one or more data sectors and at least one header sector. Employing a sequential data storage technique within the HDD offers the following significant advantages, namely: optimisation of the write speed for sequentially-generated data; fast sequential playback of the recorded data; minimal movement requirements of an associated read/write arm results in lower wear on the arm and lower HDD operating temperatures thus providing a more robust and reliable data storage system.

Optionally the method of storing data further comprises the step of recording a running index for the stored data. The running index may be stored externally to the main data storage system or optionally may be kept within the data storage system. The incorporation of a running index increases the speed by which any required data sequence can be located for reading or by which a group of data storage elements covering a required time span may be conveniently removed from the system.

Preferably the running index comprises the start times for data stored within the data storage elements. Preferably the running index comprises the end times for data stored within the data storage elements. Optionally, the running index comprises the time span of the data stored within the storage elements.

Most preferably the running index is initially stored within a RAM and periodically backed up to an in-volatile memory (e.g. a flash memory.

Alternatively the running index is stored as a hint index located within the hard disk drive system. Such an index is required to be updated far less frequently than a conventional disk file directory. Furthermore such an index is not essential to the reading of the data from the HDD.

Optionally the step of recording the data within data storage element further comprises the step of encrypting the data.

According to a second aspect of the present invention there is provided a method of storing data on a hard disk drive, comprising the steps of:
1) selecting a first allocation block from an array of sequentially arranged allocation blocks located within the hard disk drive;
2) recording data within the first allocation block until the first allocation block is filled to capacity;
3) selecting a sequentially next allocation block from the array of sequentially arranged allocation blocks;
4) recording data within the sequentially next allocation block until the sequentially next allocation block is filled to capacity; and
5) repeating steps 3 and 4 until a predetermined number of the sequentially arranged allocation blocks of the array have been filled to capacity.

Most preferably the method of storing data further comprises repeating steps 1 to 5 once the predetermined number of the sequentially arranged allocation blocks of the array have been filled to capacity.

Preferably the step of recording data within an allocation block further comprises the step of recording a running index. Most preferably the step of recording a running index comprises recording a hint index on one or more data platters.

According to a third aspect of the present invention there is provided a method of storing data on a sequential arranged array of hard disk drives, comprising the steps of:
1) selecting a first group of hard disk drives from the array of sequentially arranged hard disk drives;
2) recording data on the first group of hard disk drives until the first group of hard disk drives is filled to capacity;
3) selecting a sequentially next group of hard disk drives from the array of sequentially arranged hard disk drives;
4) recording data on the next group of hard disk drives until the next group of hard disk drives is filled to capacity;
5) repeating steps 3 and 4 until a predetermined number of hard disk drives of the array of sequentially arranged hard disk drives have been filled to capacity.

Most preferably the method of storing data further comprises repeating steps 1 to 5 once the predetermined number of hard disk drives have been filled to capacity.

Most preferably the step of recording data on one or more data disks comprises the method of storing data in accordance with the second aspect of the present invention.

Optionally the first group of hard disk drives and the next group of hard disk drives each comprise a single hard disk drive.

Preferably the first group of hard disk drives comprises two or more sequentially arranged hard disk drives. With such an arrangement the hard disk drives of the first group simultaneously record the same data.

Preferably the sequentially next data storage element comprises a second group of two or more hard disk drives wherein the sequential numbering of the hard disk drives of the second group is offset by at least one from the sequential numbering of the hard disk drives of the previous group.

According to a fourth aspect of the present invention there is provided a hard disk drive system suitable for storing data, the hard disk drive system comprising an array of data storage elements and a hard disk drive system controller wherein the hard disk drive system controller provides a means for sequentially selecting the data storage elements of the array such that data are recorded sequentially within the hard disk drive system.

Preferably the data storage elements comprise hard disk drives.

Optionally the hard disk drives are located so as to form a one dimensional array of sequentially arranged data storage elements. Alternatively the hard disk drives are located so as to form a two dimensional array of sequentially arranged data storage elements. Optionally the hard disk drives are located so as to form a three dimensional array of sequentially arranged data storage elements.

Most preferably the data storage elements comprise a group of two or more sequentially arranged hard disk drives.

Preferably the hard disk system controller comprises one or more indicators that provide information with regards to the operating status of one or more associated hard disk drive.

Alternatively, the data storage elements comprise allocation blocks located within one or more HDDs.

Preferably an allocation block comprises one or more data sectors and at least one header sector.

BRIEF DESCRIPTION OF DRAWINGS

Aspects and advantages of the present invention will become apparent upon reading the following detailed description and upon reference to the following drawings in which.

DETAILED DESCRIPTION

Figure 1A:
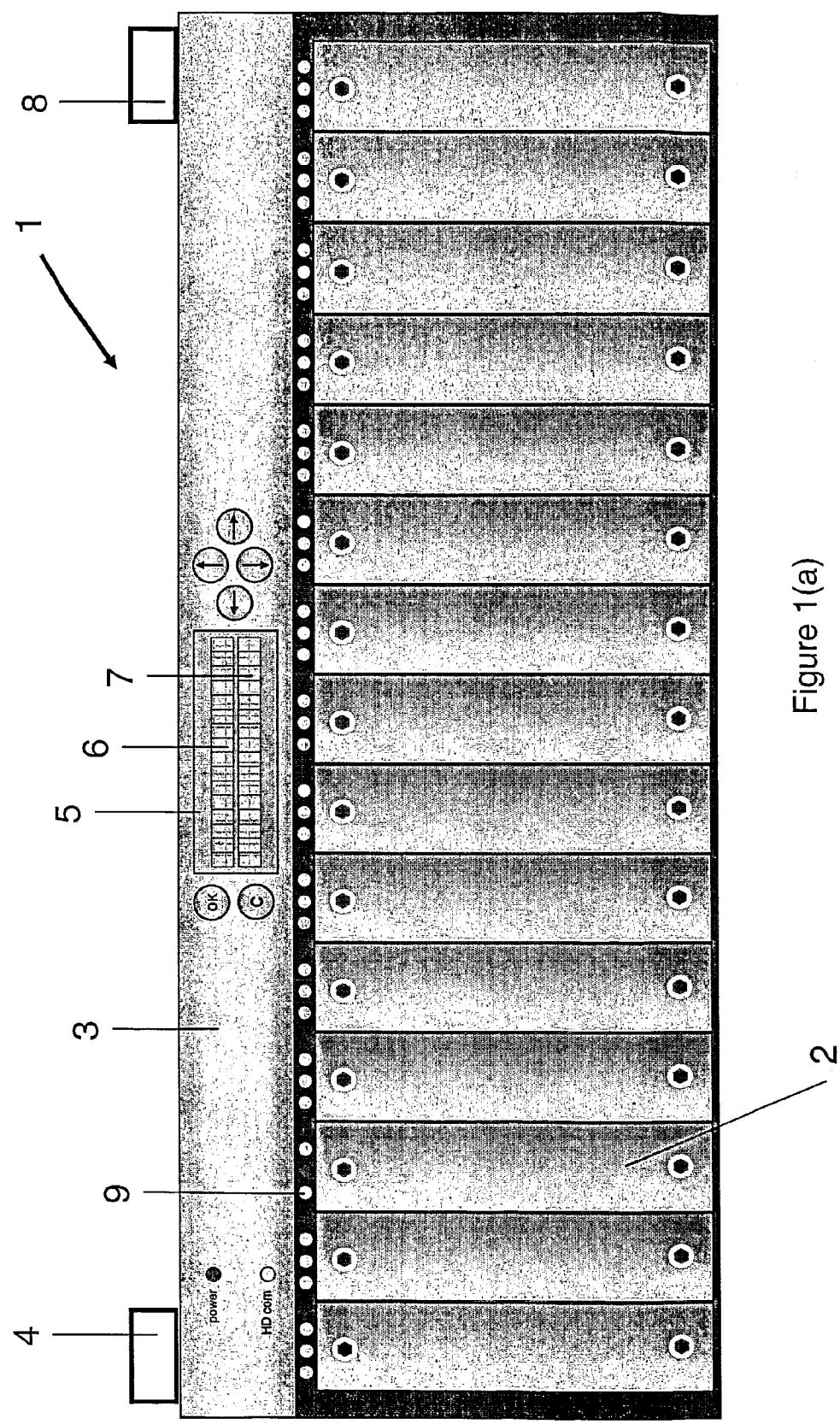
FIG. 1 presents
(a) a front view; and
(b) a schematic representation,
of a HDD data storage system in accordance with an aspect of the present invention.

In order to assist understanding of various aspects of the present invention, FIGS. 1(a) and (b) present a front view and a schematic representation, respectively, of a HDD data storage system 1.

The HDD data storage system 1 comprises an array of fifteen Hard Disk Drives (HDDs) 2 the operation of which are controlled by a HDD array controller system 3. The controller system 3 comprises a data interface 4 (such as Ethernet, SCSI, USB, Fibre-Channel or other fast interface), a controller board 5 including a CPU controller 6 and a HDD controller 7, and a power supply 8. The controller system 3 further comprises three LED status indicators 9 associated with each HDD 2. During operation the status indicators 9 corresponding to each HDD 2 in the array, are addressed and controlled by the CPU controller 6. The indicators 9 provide information as to the status of the associated HDD 2 e.g. as to when the HDD 2 is, for example, Selected, Active, Reading, Writing or Failed.

Figure 2A:
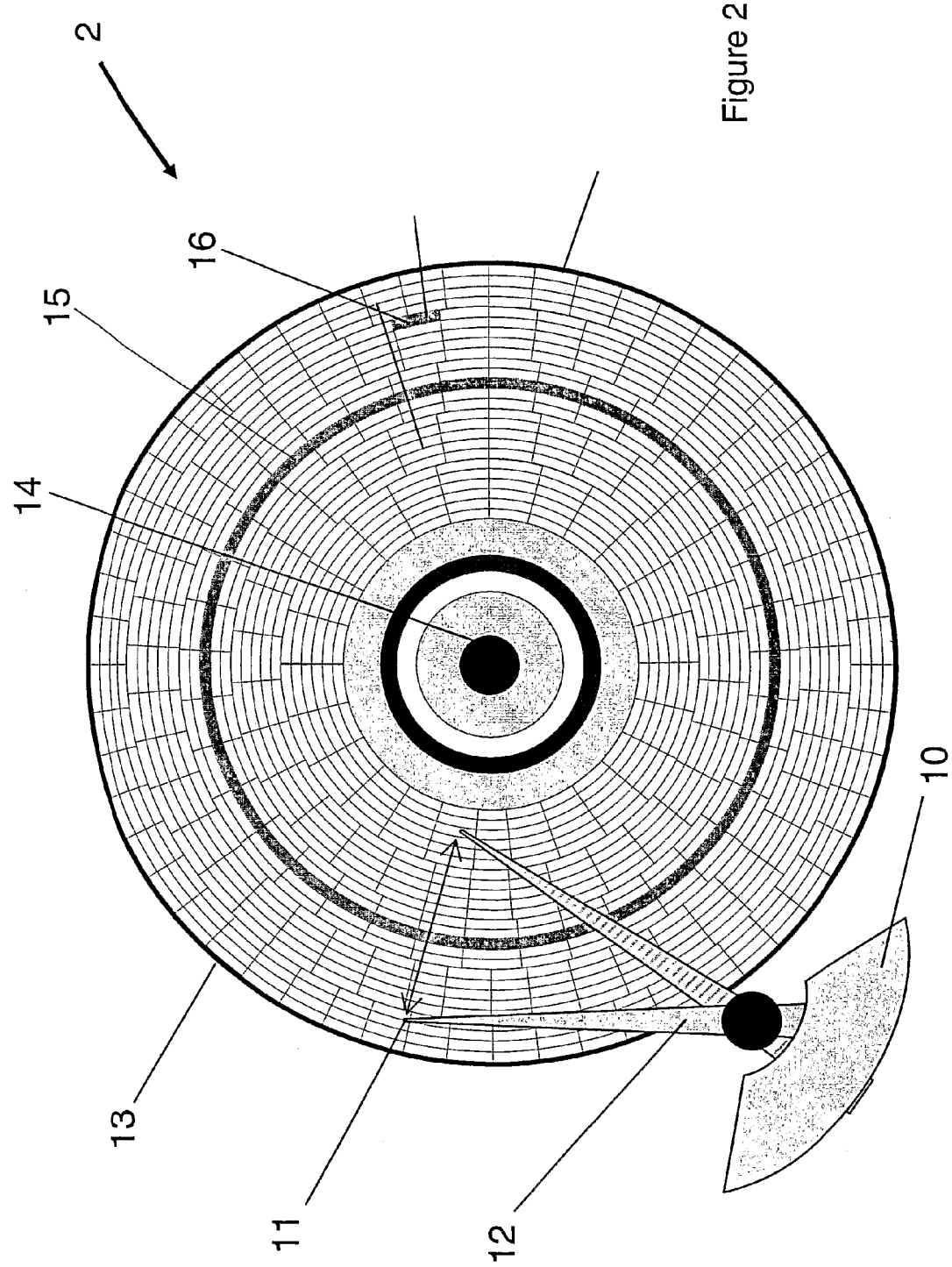
FIG. 2 presents
(a) a top view of a single platter Hard Disk Drive; and
(b) a schematic representation of a four platter Hard Disk Drive,
both of which are suitable for use within the HDD data storage system of FIG. 1.

Further detail of the HDDs 2 are presented in FIG. 2. In the example shown in FIG. 2(a), the HDD 2 comprises an actuator assembly 10 employed to control the relative position between a read/write head 11, located at a distal end of a read/write arm 12, and a data surface of an associated platter 13. As is normal practice in the art the platter 13 within the HDD 2 is mounted on a spindle 14.

Figure 2B:
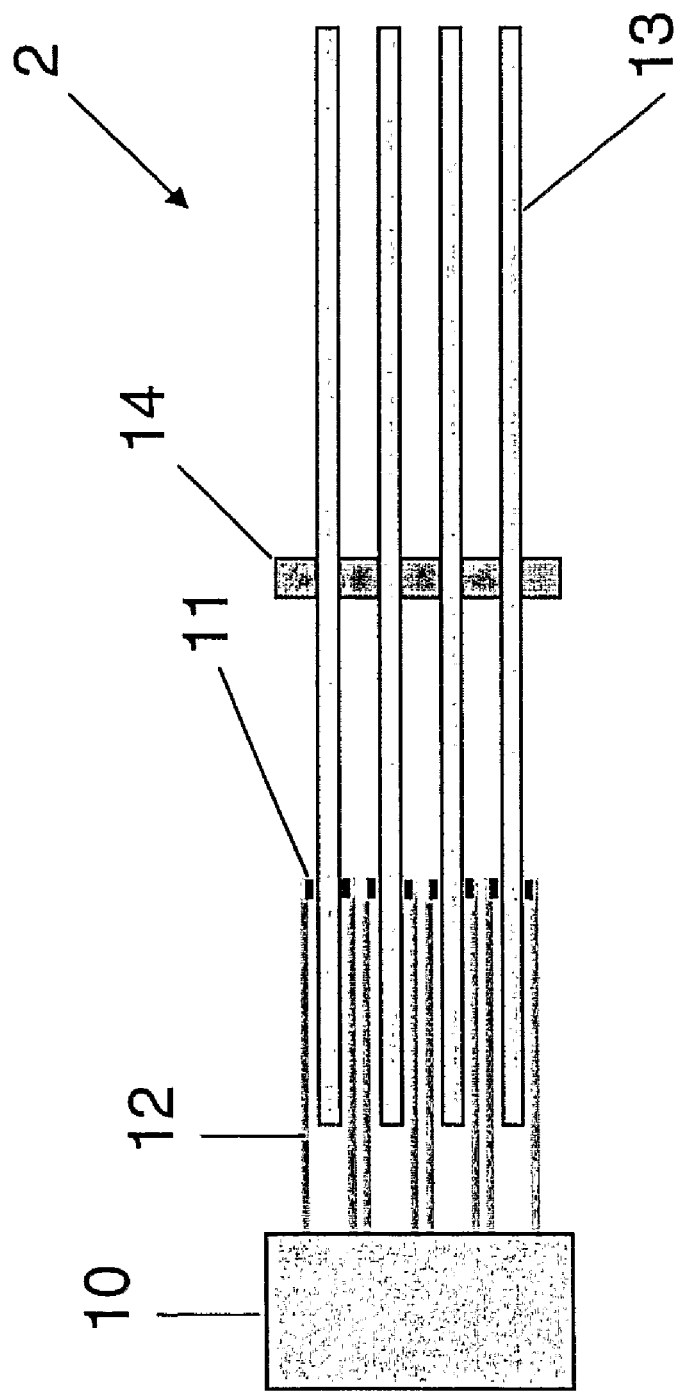

As appreciated by those skilled in the art, each hard disk platter 13 has (potentially) two recording surfaces. Alternative HDDs 2 that comprise multiple disk platters 13 and read/write head 11 combinations are also known within the art. By way of example only, FIG. 2(b) presents a HDD 2 that comprises four platters 13 mounted on a common spindle 14 with eight associated read/write heads 11 all of which are controlled by the actuator assembly 10 via associated read/write arms 12.

The recording data surface of a platter 13 is divided up into a series of finely spaced concentric cylinders 15. Each of these cylinders 15 acts as a recording track and each track is further divided up into sectors 16 of equal size (thus there are more sectors in the outer tracks than in inner tracks). In nearly all modern hard disks platters 13, each sector can record 512 bytes of information. The authors note, however, that there is a current proposal within the art to increase the standard capacity of disk sectors to 4,096 bytes per sector. However, as the electronics within the HDD 2 takes care of addressing all of the sectors within a HDD 2 via manufacturer-specific firmware, the system of FIG. 2(*b*) can simply be considered as an extension of the single platter HDD 2 of FIG. 2(*a*). Whichever disk filing system (DFS) is employed then provides the required means for keeping track of all of the files recorded and their location on the platters 13.

Within the present system, any combination of HDDs 2 and data capacities may be used. This is unlike RAID systems where the HDDs 2 have to be closely matched if not identical in terms of performance and capacity.

It will be appreciated that within the present system if HDD of varying capacity are to be used with one of the mirrored writing modes, then the optimal arrangement of the HDD is in order of increasing capacity, as this will provide the maximum effective storage capacity. Furthermore, it will also be appreciated that any standard platter type 13, and known read/write methods, may be employed within each HDD 2.

Figure 1B:
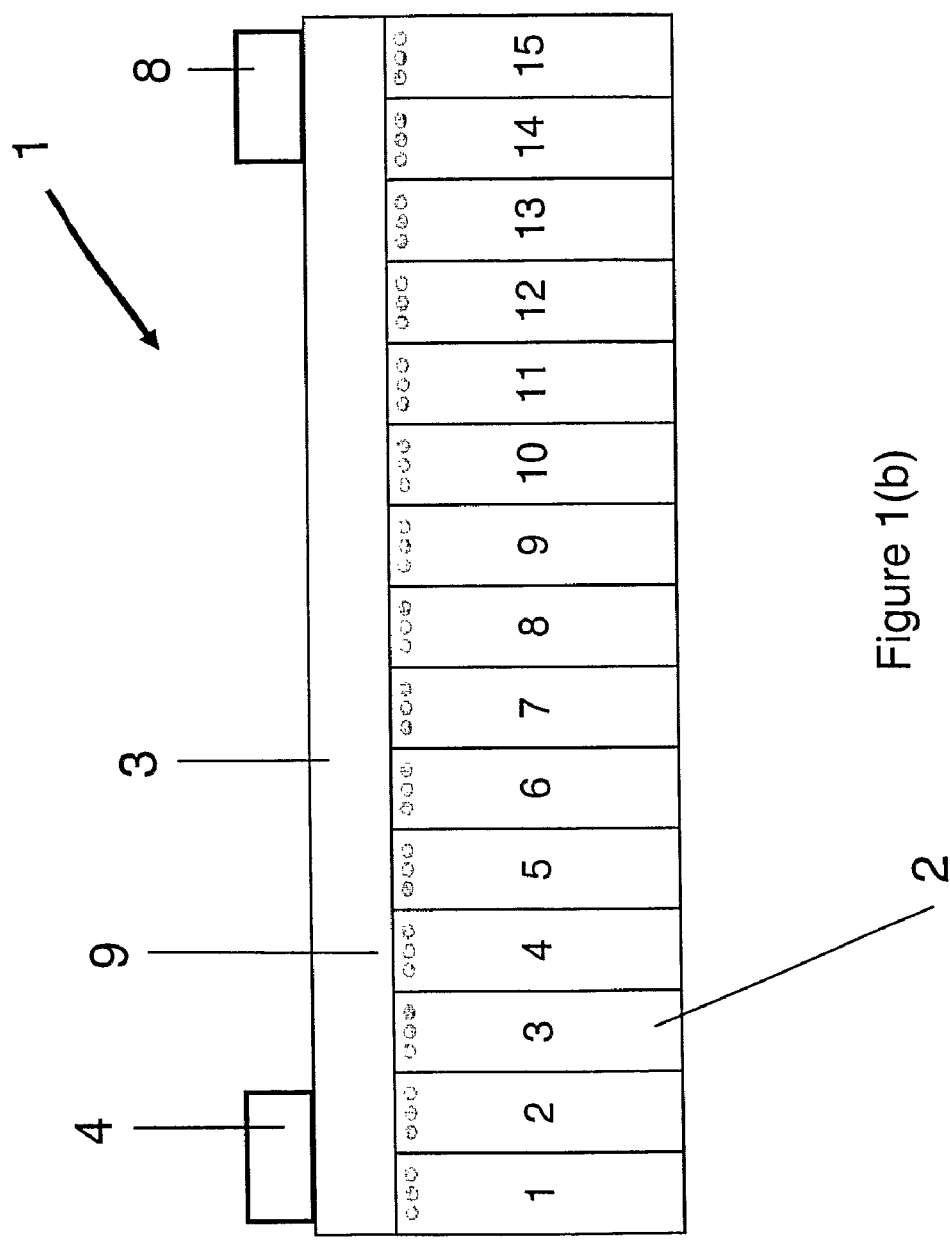

A first mode of operation of the data storage system 1 will now be described with reference to FIG. 1(*b*). In the first instance data are recorded onto a data storage element comprising the first HDD 2, until that HDD 2 is full, whereby the next data are recorded onto the next data storage element, namely the second HDD 2. This process continues through the third and fourth HDDs 2 until the array of HDDs is full. At this point the next data are again recorded onto the first HDD 2, so as to overwrite the oldest data in the sequence. This process can effectively continue on an endless-loop basis. In the presently described embodiment, the time span of the available recorded data is set by the average rate of data generated (bits/sec) and the total capacity of the HDD array.

It is preferable for the CPU controller 6 to provide a File Retention Limit [FRL] setting, which permits a user defined limit on the data storage time span (e.g. 30 days). This time limit is always less than the total potential capacity of the HDD array, at a given average data rate. In this embodiment, the oldest data begins to be overwritten as soon as the FRL is reached, leaving any remaining HDD capacity blank. This can be an important feature to follow local laws, regulations and best-practice guidelines for certain applications in some countries.

There are many advantages of recording time-based data in this strictly sequential fashion. In the first instance the CPU controller 6 acts to fully switch off (i.e. removes power) from all the HDD 2 which are not being written to, or read from. Thus in normal circumstances only one HDD 2 is powered up at any time. The CPU controller 6 monitors the average rate of use of the HDD 2 capacity as data are recorded and powers up the next HDD 2 in the sequence in sufficient time such that the HDD 2 is spun up and ready to accept data in advance of the previous HDD 2 being full. The advance power-up period also allows the CPU controller 6 to check the next HDD 2 in the sequence, find the first available sector on the HDD and read the HDD 2 capacity. By employing modern drives and a good disk filing system, the advance power-up process only takes a few seconds, inclusive of HDD checking.

In normal use, the recording process means that only one HDD 2 is active at a time. However, a read request may be received by the data storage system 1 at any time, for a segment of data from anywhere within the time span currently stored on the array. To accommodate such requests the CPU controller 6 keeps a running index of the start and end times of the data stored within each HDD 2 within the array. The running index may be stored in non-volatile memory in the form of a flash memory or even another HDD 2 which is accessed directly by CPU controller 6. Alternatively, the running index may be stored in a RAM of the CPU controller 6.

Although storage of the running index on a separate HDD 2 is a working option it is a not a particularly desirable one since this HDD 2 would need to be switched on at all times.

The concept of the running index can be further extended such that it may replicate the full function of a database management system (DBMS), employed to keep a track of all of the data files in the data storage system 1. As will be appreciated by those skilled in that art such an index is best stored in RAM for speed or the reading, modification and writing processes. However, a power loss would mean a complete loss of the database index. Whilst the simple running index may be rebuilt relatively quickly on the resumption of power, the rebuilding of a full DBMS index would be significantly more time consuming without the periodical back ups.

To accommodate these various options it is therefore preferable for the running index to be initially stored in RAM and then backed up to an in-volatile flash memory at periodic intervals.

Irrespective of the exact storage form of the running index the data retrieval process remains the same. When a read request is received, the CPU controller 6 simply powers up the corresponding HDD 2 and reads the relevant data. Modern HDD 2 systems spin up very quickly and so have a delay of only a few seconds after power-up before responding with the required data. Normally the HDD 2 containing the data from which data is being read will automatically power-off after a user-definable time-out period (for example 10 minutes).

With the above described data storage systems 1 data is never deleted except by overwriting with new data. This is an essential part of the scheme, especially for the storage of potential evidential data, such that once data is recorded, it cannot be modified at any time, nor can it be deleted until it expires and is overwritten. Thus the described data storage system 1 provides full online data writing performance at the maximum bandwidth of the HDD sub-systems, whilst simultaneously providing near-line data access performance when replay of the recorded time-based data is required.

The data storage system 1 also provides a number of additional advantages over those system described in the prior art. In the first instance the data storage system 1 uses far less power than a conventional HDD array. For example, in a 15-drive array, little more than $1/15^{th}$ of the power will be used on average compared with a conventional array. Similarly, in a 64-disk array, only $1/64^{th}$ of the power would be used. Put another way, the fact that only one HDD 2 is operating at a time means that each HDD 2 will be switched on and in use for only a fraction of time compared to normal operation, thus dramatically extending the life of the HDD 2. For example, in the described 15-drive array, each drive would be switched off for $14/15^{ths}$ (93%) of the time. Another way of looking at this is that each HDD 2 would only be in use for 26 days in a year, whereas in conventional data storage systems every drive would be on for 365 days per year.

Since only one HDD 2 is generally in operation at any one time there is minimal heat dissipation from other HDDs 2 and forced cooling is rendered redundant, or at least considerably reduced. The HDDs 2 are also found to operate at a much lower temperature, thus increasing MTBF and reliability.

A further advantage of the fact that only one HDD 2 is operating at a time, is that there is minimal vibration transmitted from the other HDD 2 and thus the inherent drive wear and tear is considerably reduced, again resulting in an increased MTBF and overall reliability.

It will be noted that the recordings on each HDD 2 covers one complete contiguous time span. (e.g. 10:03:27 on 12 Jan. 2006 to 12:32:13 on 14 Jan. 2006). The CPU controller 6 can therefore be employed to display this time span as each HDD 2 is selected in turn by the HDD controller 7. Alternatively, the time span can be displayed on a networked computer display running monitoring software. Thus, the actual physical HDD 2 on which the data corresponding to any particular time span is to be found, can be identified extremely quickly and conveniently. This is an extremely useful feature for evidential data systems (such as surveillance recordings), particularly as the HDD 2 corresponding to the time of a particular event or incident can be quickly identified and physically removed for safekeeping (e.g. by the police or other authorities). Such easy location of data physically in an array is not possible with conventional methods, especially RAID configurations. Note that in a RAID 5 system, the entire array, including the chassis and controller must be taken away to be of any practical use since each HDD 2 contains only partial and effectively useless information without all the other HDD 2 being present.

A significant and useful consequence of the described data storage systems 1 is that the stored time span may effectively be made infinite by removing the recorded HDD 2 at any time before they are overwritten, and by replacing them with new, blank HDDs 2. Thus very long data archives can be created by removing and replacing HDDs 2 on a continuous basis. Further, as the basic time-span of the array is likely to be of the order of weeks (say 30 days), then the HDD 2 can be replaced at leisure, and at irregular intervals of any time less than 30 days in our example.

Within the presently described data storage systems 1, HDD 2 failure is far less likely, due to the increased MTBF and HDD 2 lifetimes. If a HDD 2 should fail, however, the data are automatically re-directed to the next HDD 2 in the HDD 2 sequence and the failed HDD 2 highlighted with the corresponding status indicator 9. Notification of HDD 2 failure can be by means of audible sound, CPU controller display or display on any remote management application running on a networked computer. The data loss is therefore limited to one HDD 2, although it is recognised that any data loss, however less likely in the present system, is a still of a significant disadvantage.

An advantageous consequence of the data storage systems 1 is that any HDD 2 which is not active or has failed may be removed and replaced in the data storage systems 1 at any time. Furthermore, any HDD 2 which is active (i.e. being written to), may be removed by forced skipping to the next HDD 2 in the sequence through the controller board 5 or software interface, or by simply removing the drive and causing an effective "fail".

A number of alternative embodiments to the above described data storage systems 1 will now be described in detail.

Two and Three Dimensional Array Data Storage System

Figure 3:
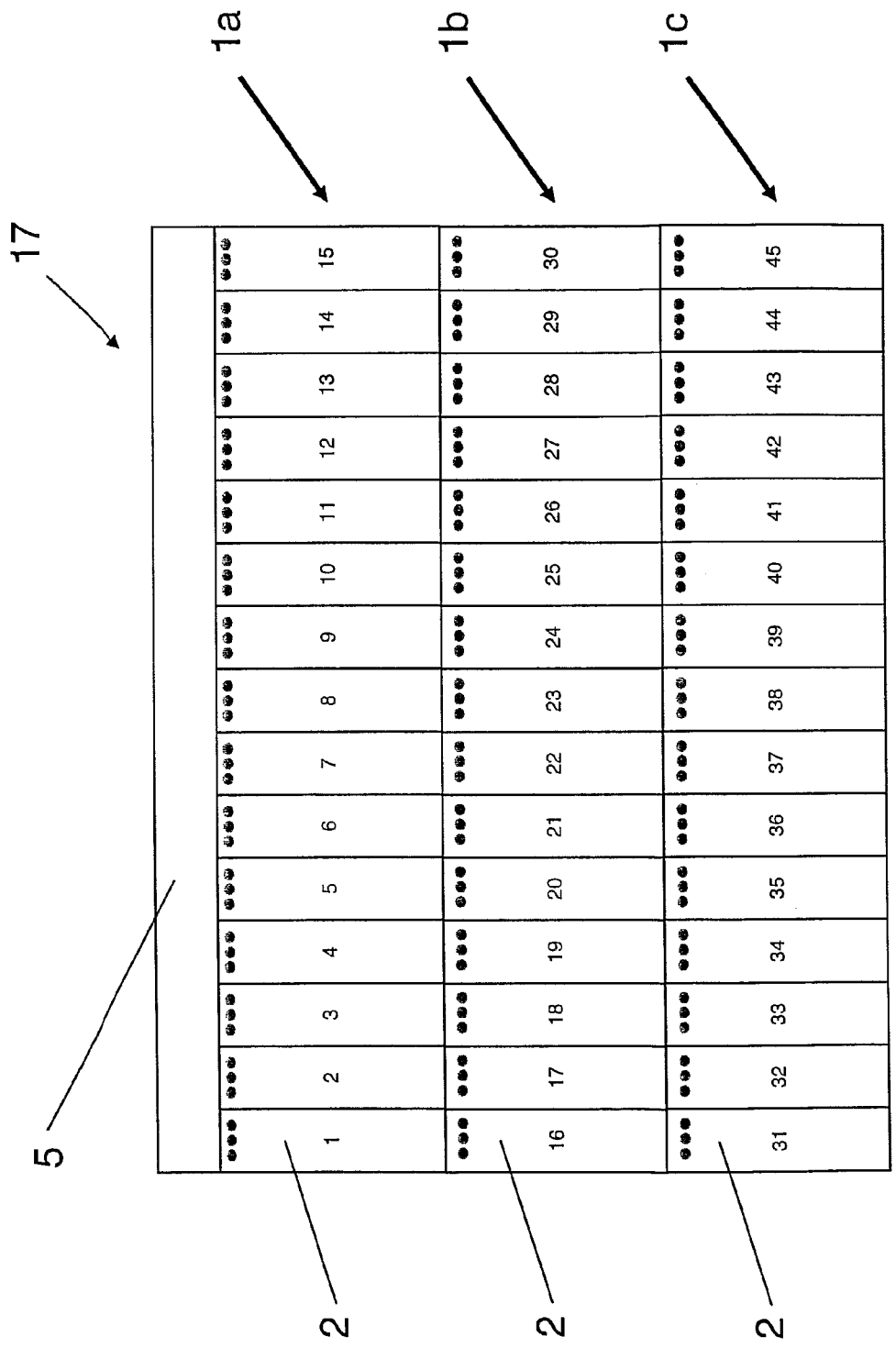
FIG. 3 presents a front view a two dimensional array HDD data storage system in accordance with an embodiment of the present invention.
Figure 4A:
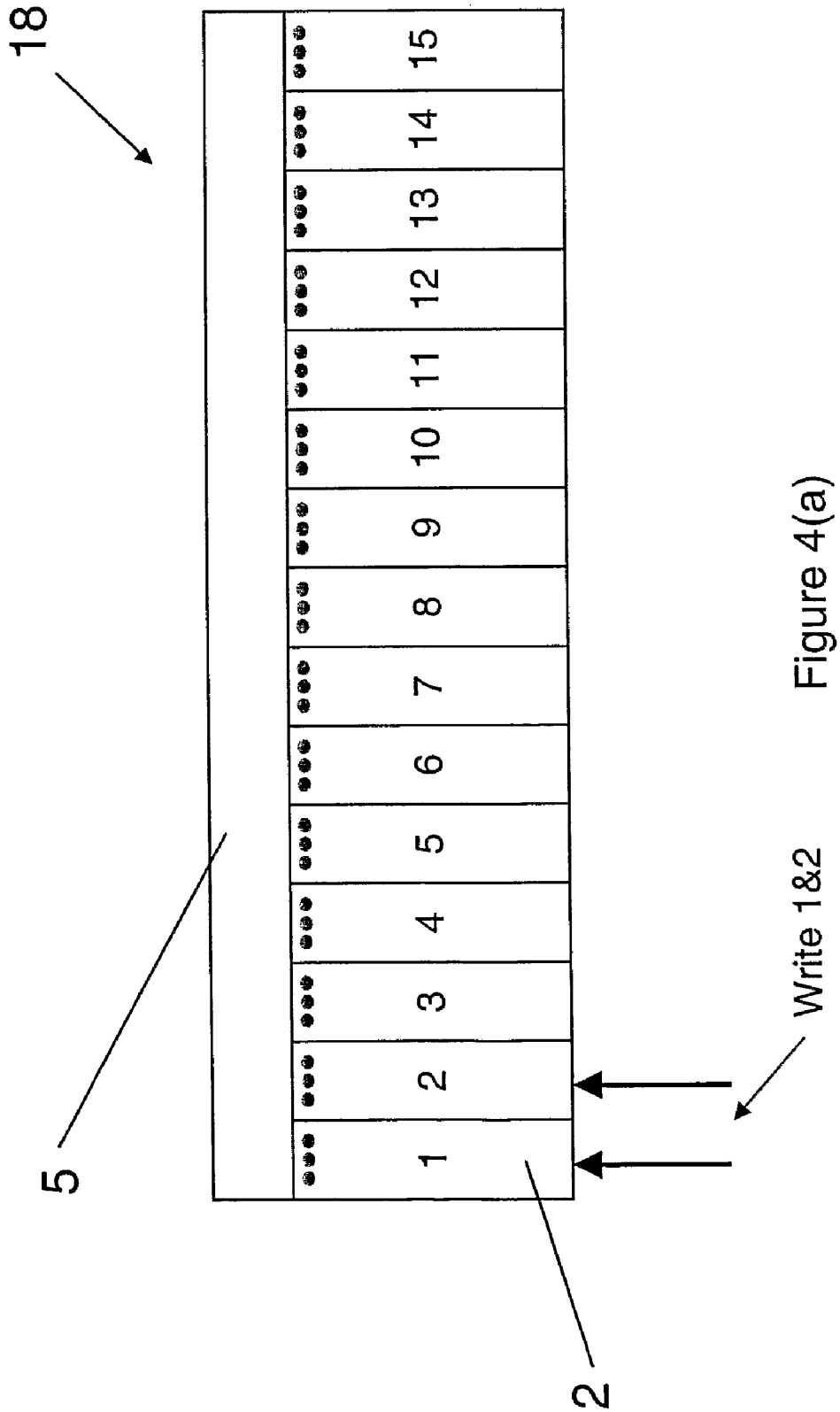
FIG. 4 presents a schematic representation of five stages of a mirrored write performance HDD data storage system in accordance with an embodiment of the present invention. The particular the stages shown correspond to data being written to:
(a) a first HDD pair;
(b) a second overlapping pair of HDDs;
(c) a third overlapping pair of HDDs;
(d) a final overlapping pair of HDDs; and
(e) a HDD pair comprising the last HDD and first HDD in the data disk array.
Figure 4B:
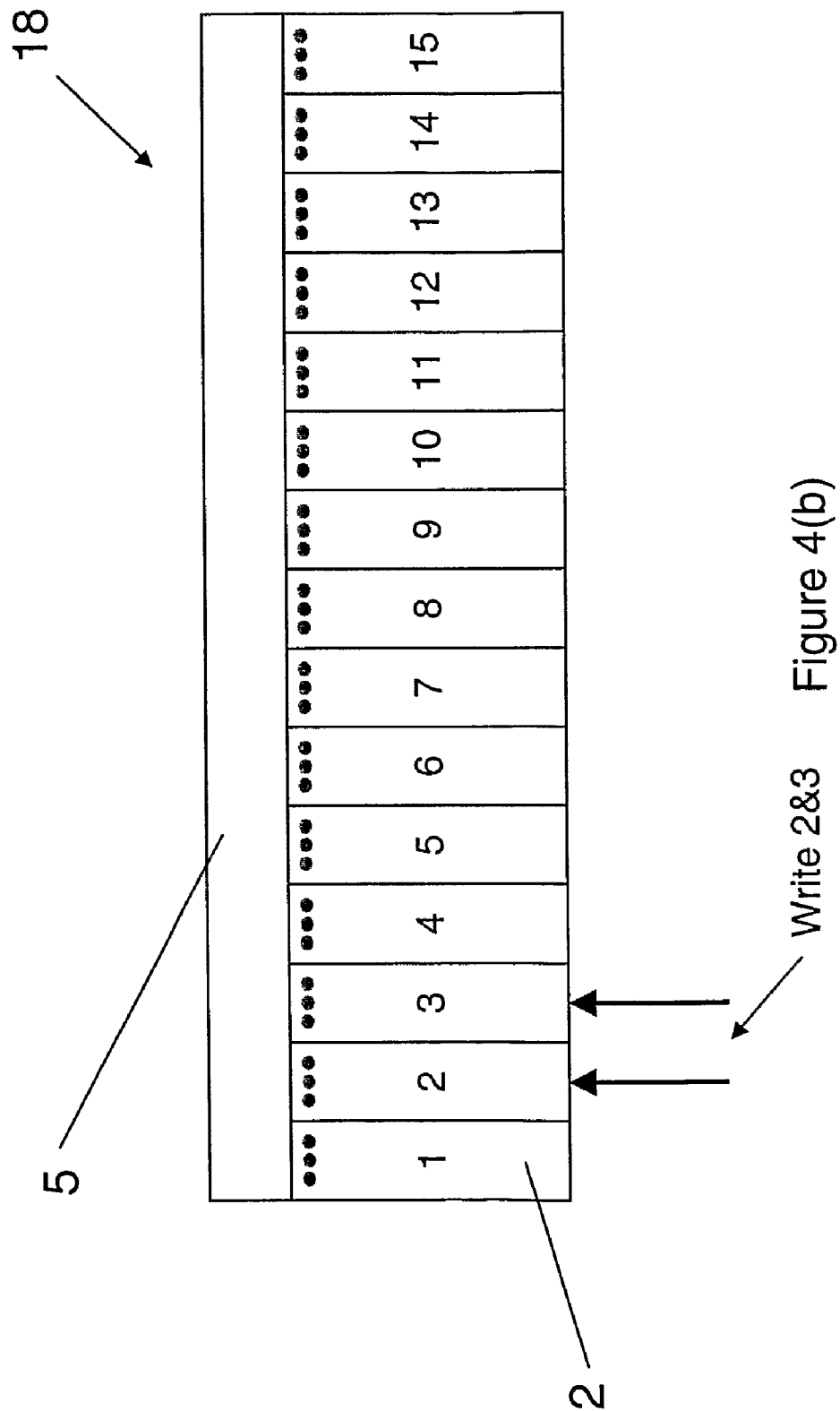
Figure 4C:
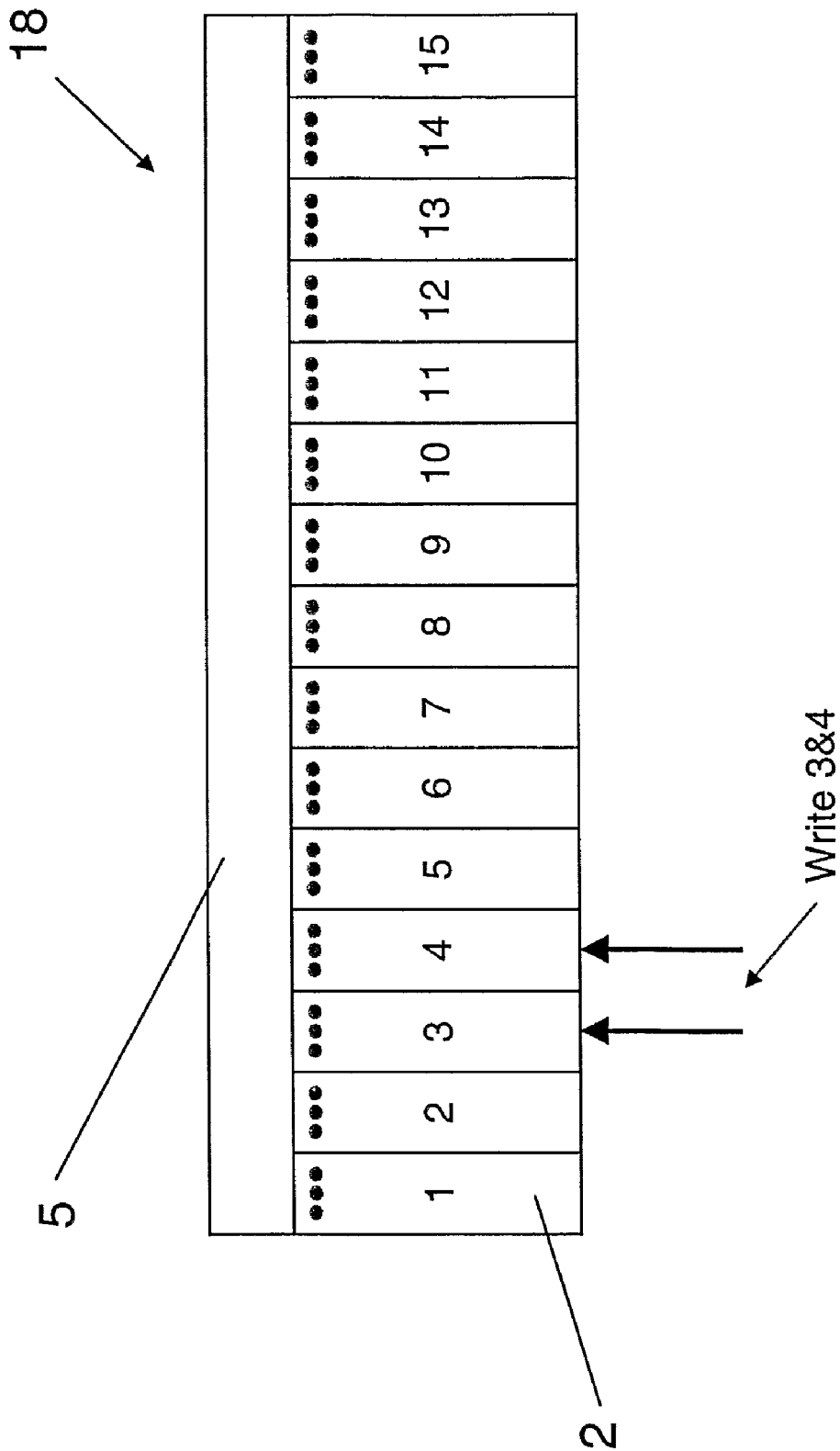
Figure 4D:
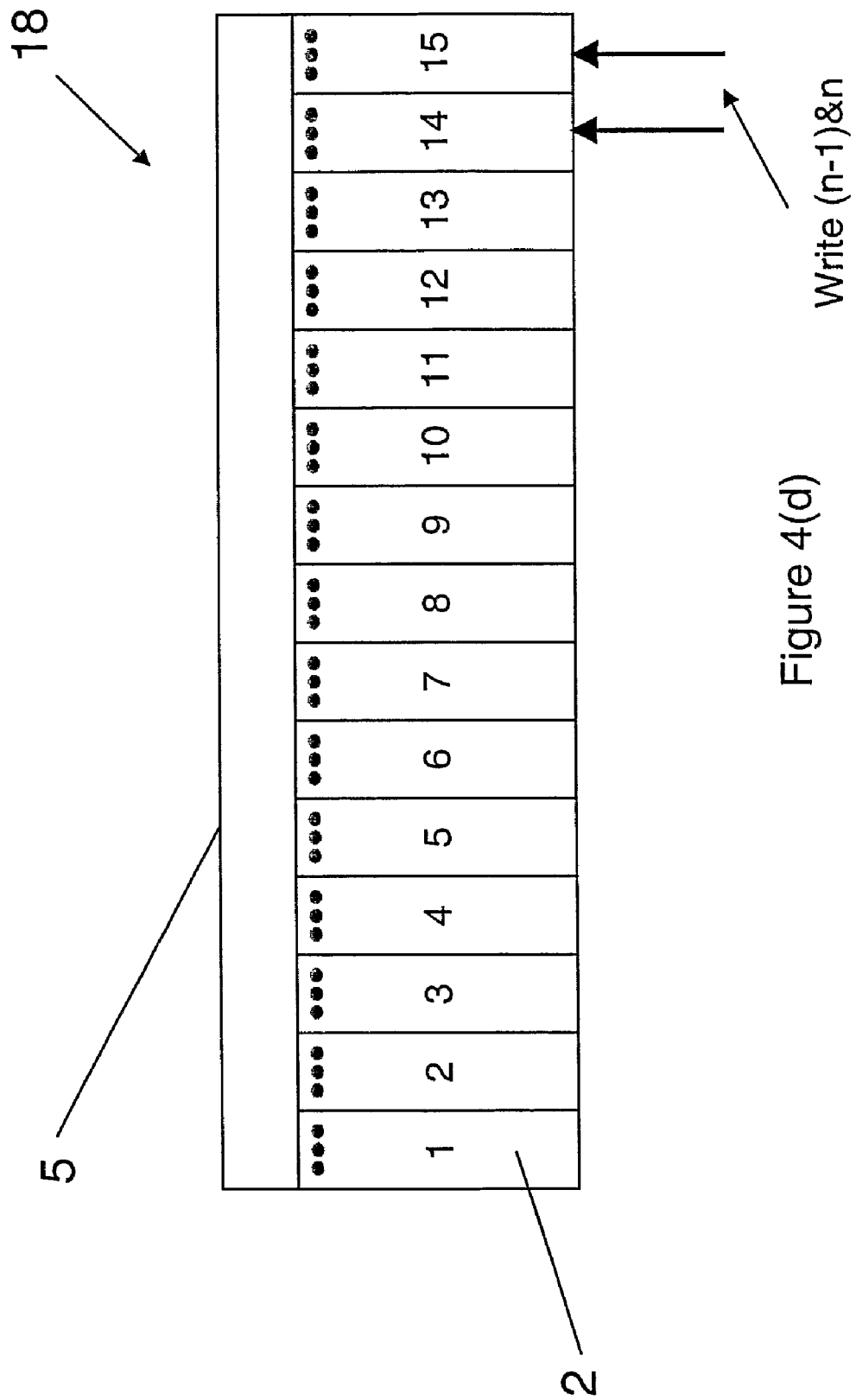

FIG. 3 presents a front view a two dimensional array data storage system 17. As can be seen the two dimensional array data storage system 17 is an extension of the previously described data storage system 1 wherein a two dimensional array of sequentially arranged HDD 2 is now employed. The two dimensional array data storage system 17 provides a convenient arrangement that allows for the use of multiple stacked units of slave arrays 1*a*, 1*b* and 1*c* connected to a master controller board 5. With such schemes, literally hundreds of HDD 2 can be addressed, with only one HDD 2 ever being active at any one time. For such large capacity installations, the resultant savings on power, cooling and air-conditioning costs can be considerable.

It will be readily apparent that the principles of the two dimensional array data storage system 17 can simply be extended so as to form a three dimensional array data storage system that operates in a substantially identical manner. However, it should be noted that there is no requirement for the next HDD 2 in the sequence to be physically located next to the previous HDD 2. The essential requirement of all the systems is that there exists a sequential relationship to the order in which the individual HDDs 2 are accessed that is maintained during operation of the system.

An increased functionality for the described array data storage systems occurs through the employment of two or more master controller boards 5. Each master controller board 5 is connected to the originating data source (such as Ethernet or SCSI) in such an arrangement that secondary master boards 5 effectively act as slaves, except that they also retain a copy of the disk time span index. Thus, were a master controller board 5 to fail, a secondary master board 5 could immediately pick-up the controller tasks and the array system could carry on working. Due to the architecture of such an arrangement, the HDDs 2 associated with the faulty master board 5 can be removed and put into replacement arrays (or even HDD arrays of a slave unit) which are then incorporated back into the system in place of those associated with the faulty unit. All of this can be done on a hot-swap basis.

Mirrored Write Data Storage System

As discussed in detail above, nearly all HDD 2 failures occur during the write process and any data loss however small, is a still a significant disadvantage for any data storage system. With the aid of FIG. 4, a data storage system which provides mirrored write performance and protection without having to commit twice the storage capacity to the system (as required for example with a RAID 1 system), is now described.

The mirrored write data storage system 18 is implemented as follows. Instead of writing to a data storage element comprising a single HDD 2, the same data is simultaneously written to a data storage element comprising a pair of HDD 2. In the presently described example, data are initially written to the first and second HDD 2 (referred to as "Write 1&2"), see FIG. 4(*a*).

As these HDDs become full, the third HDD 2 is powered up so as to be ready for use. The data writing then switches from the first and second HDD 2 ("Write 1&2"), to the next data storage element, namely the second and third HDD 2 ("Write 2&3"), see FIG. 4(*b*). The first HDD 2 is then powered down. As a result, the data which have just been written to the second HDD 2 is now overwritten immediately with new data. Since a copy of this data is safely stored on the first HDD 2, which has been powered down, it is highly unlikely to fail.

The data writing continues in this, pattern, writing to subsequent data storage elements comprising HDD 2 pairs e.g. "Write 3&4" see FIG. 4(*c*), "Write 4&5" etc. As the write pairing moves on, the trailing full HDD 2 is switched off. This writing to overlapping pairs of HDD 2 continues until HDD n is reached, see FIG. 4(*d*), at which point the writing sequence pairs will be "Write (n-1)&n", then "Write n&1", see FIG. 4(*e*) (i.e. last and first HDDs 2) and then back through the sequence "Write 1&2", "Write 2&3" etc.

This mirrored write data storage system 18 provides mirrored redundancy during the critical writing part, and is as efficient as RAID 5 systems in providing n-1 total capacity. This scheme also maintains all the advantages of the previously described data storage systems 1, with only minor reductions experienced in the advantages of power use, temperature and vibration isolation.

By employing the mirrored write data storage system 18, a data storage system is provided that can cope with a HDD 2 failure without any loss of data. Consider for example a failure the fourth HDD 2 when the pair being written to is "Write 3&4". Immediately when a HDD 2 failure is detected in the fourth HDD 2, writing continues as normal within the third HDD 2, whilst the fifth and sixth HDDs 2 ("Write 5&6") are powered up. After a few seconds these drives are ready to accept data, and all writing is switched to them. The third and fourth HDDs 2 are then switched off, preserving the data within the third HDD 2 (the good HDD) and allowing the fourth HDD 2 (the bad HDD) to be replaced at leisure. The "Fail" status indicator 9 associated with the fourth HDD 2 would then illuminate to indicate which HDD 2 had failed and thus which is required to be replaced.

It should be noted that there is no urgency to replace the bad HDD 2, as would be the case within a RAID system where a second HDD 2 failure would mean catastrophic loss of all data until such time as a new HDD 2 had been fitted and the failed HDD 2 completely rebuilt. Within the mirrored write data storage system 18, when the bad HDD 2 is replaced, nothing need be done with it until the writing process loops back round and data are required to be recorded within the HDD 2. This will only occur after the storage period of the full data array has expired. A further significant point to note is that the surviving HDD 2 in a faulty pair is only exposed to a few seconds of non-mirrored writing, thus making the chances of complete data loss negligible.

The described mirrored write data storage system may be further extended such the first data storage element comprises m sequentially arranged HDDs 2. The next overlapping data storage element would then also comprise m sequentially arranged HDDs 2, with an offset of less than m introduced between the sequential numbering of the HDDs 2 of the first and second data storage elements.

For example, with m set to three and the sequential offset between data storage elements set to be two a triple-mirrored data writing system that provides dual mirrored data storage is produced. By writing the same data to three HDDs 2, and then sequentially skipping two HDDs 2 before the next write process takes place, only one of the three HDDs 2 of the data storage element is ever overwritten, thus leaving two identical copies behind. This method of providing stored mirrored pairs finds particular application within systems that are extremely data-critical. Furthermore, this technique has an advantage over normal mirrored storage systems (e.g. RAID 1 systems) in that if a HDD 2 fails you are still with a full stored mirrored pair of HDDs 2. A RAID 1 system would only leave you with a single copy, which must then be duplicated so as to rebuild the HDD 2 pair, so putting the one and only surviving original HDD 2 under additional strain and risk of failure when its contained data are being read.

Furthermore, employing the presently described triple-writing, dual-storage technique allows for the removal of one HDD 2 from each data storage element for permanent storage or handover purposes.

Hard Disk Filing System

As discussed above, the data storage systems 1, 17 or 18 may employ standard read/write methods known to those skilled in the art. The integrated electronics and firmware within conventional HDDs 2 generally allow for the addressing of all sectors in the HDD 2 by sector number. Conventional Disk Filing Systems (DFS) then typically group a number of sectors into clusters and the HDD 2 is formatted according to these cluster sizes. For example, a typical cluster size for a modern DFS would be 16 sectors totaling 4,096 bytes or 4 kB. A file larger than 4 kB will use as many clusters as required for the file, and a file smaller than 4 kB will still use up 4 kB as this is the smallest addressable block in the filing system. Those skilled in the art will be aware that the standard disk sector size, currently 512 bytes, is likely to increase to 4,096 bytes in the future. Accordingly, conventional DFSs will also in future adopt different cluster sizes.

DFSs known in the art employ various directory schemes to keep track of all files recorded and their locations. The directory is usually kept at the beginning of a data platter as this location provides for the fastest read times. A DFS will split larger files across many clusters, and in order to use HDD space most efficiently, these clusters may be scattered across the platters. This is called fragmentation, and recording, modification and deletion of many thousands of files eventually causes severe fragmentation and slows down HDD 2 performance as the HDD 2 fills with many fragmented files. It is noted, however, than some modern DFS schemes mitigate the fragmentation effect to some extent. Conventional DFS methods also make for a large and complex directory structure as all the cluster locations of all the files and file fragments are recorded. Even an empty HDD 2, formatted with a standard DFS, may use anything between 1.8% and 4% of the recording capacity, just for the directory structure, and this may increase further in extended use if many small files are written to the HDD 2, depending on the DFS type.

Note that with most DFS schemes, if a file is deleted, it is simply deleted from the directory, not actually deleted from the file data area. This makes for very fast file deletion times.

Figure 5:
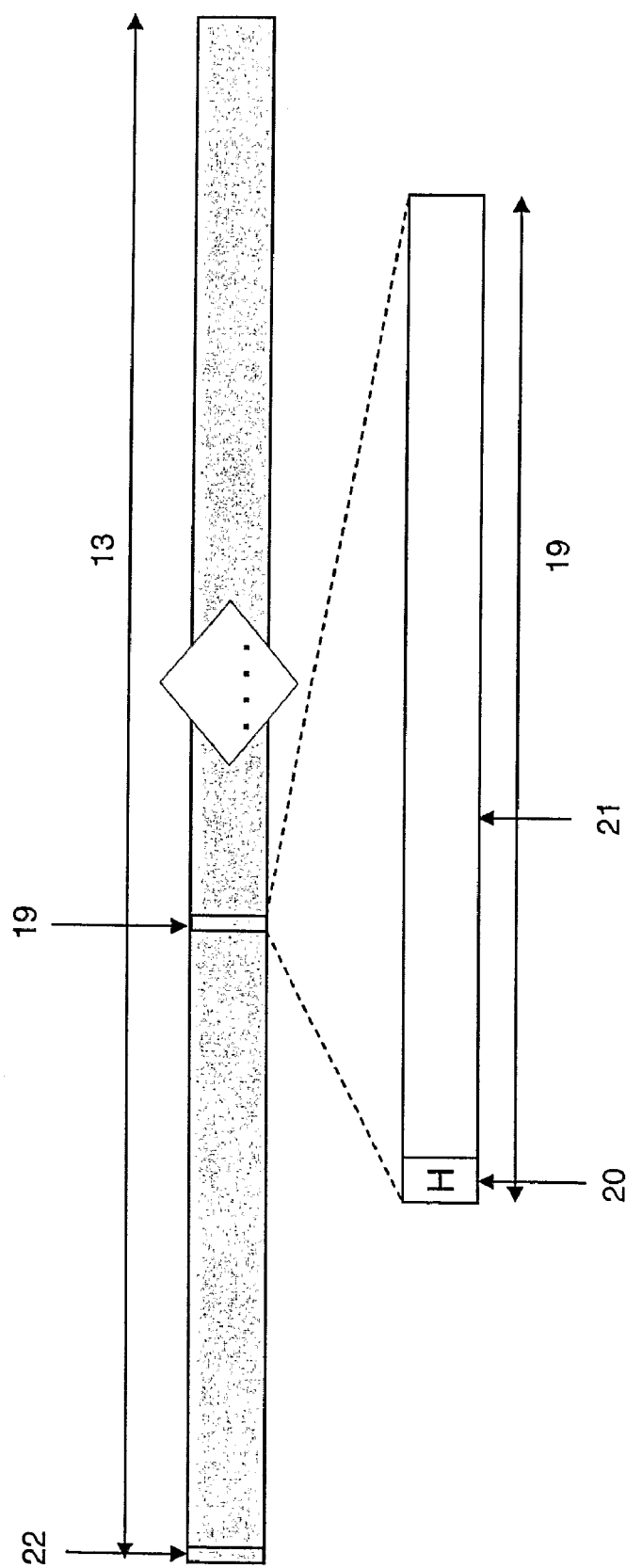
FIG. 5 presents a schematic representation of a data disc platter that employs a sequential filing system (SFS) in accordance with an aspect of the present invention.

An alternative, and preferred, hard disk filing system will now be described in detail, with reference to FIG. 2(a) and FIG. 5. FIG. 5 presents a schematic representation of a data disk platter 13 that incorporate this hard disk filing system. The hard disk filing system again exploits the principle of sequential data storage of data generated on a strictly sequential time basis. This disk filing system is hereinafter referred to as the Sequential Filing System (SFS).

From FIG. 5 it can be seen that the SFS divides the sectors into a number of sequentially located data storage elements referred to as Allocation Blocks AB 19. Each AB 19 consists of 129 sectors 16 and in particular a Header sector 20 and 128 data sectors 21. Thus each AB 19 comprises 129×512 bytes or 64.5 kB in size. It can be seen that the ABs 19 is much larger than typical disk clusters. Normally this would be inefficient for a storage system where the file sizes to be recorded vary dramatically and many very small files are stored. However, large AB sizes are ideal for sequential data recording where the recording applications typically generate large files.

The Header sector 20 of the AB 19, is key to the operation of the SFS system as it at least contains the start time and date of for the data stored within the AB 19. In this context a "file" will be defined by the external data generation application and will generally span multiple ABs 19. Optionally the Header sector 20 may also store the following information, namely: channel number, position of previous AB for this channel, position of next AB for this channel, start of file and end of file markers, and optionally also encryption data for this AB 19.

In operation, the SFS reads and writes data to the ABs 19 in a strictly sequential manner on a time basis. This data rate may however vary dramatically. It may also start and stop unpredictably and there are likely to be many different channels being recorded simultaneously (e.g. video channels, audio tracks, data streams etc.). Thus, the SFS is required to properly manage all of these events and so includes methods to achieve total management of irregular and varying multi-channel data and thus full control of the disk writing/reading processes.

To achieve the above requirements the SFS employs the CPU controller 6 to maintain a 64 kB buffer for each channel from which information is to be recorded. As soon as each buffer is full the CPU controller 6 then selects the first available AB 19 and writes the entire block to this AB 19, and any additionally required sequentially located ABs 19. The entire HDD 2 is sequentially filled in this way, thus ensuring full utilization of HDD capacity and full sequential streaming of the data. Once the HDD 2 has been filled to capacity (and any other HDDs in the array have also been filled), the CPU controller 6 loops back such that any subsequent data overwrites the data originally stored within the first ABs 19.

It should be noted, that if separate data channels are in use, the individual channels may not necessarily be in strict sequence, but this has no bearing on system performance since the Header sector 20 contains information about previous and next channel ABs 19.

A further point to note is that since the SFS employs one Header sector 20 for every 128 data sectors means that only 0.78% of the capacity of the HDD 2 is used for file header information, compared with to up to 5% for a conventional directory system.

The SFS can operate in this simple manner because data are never deleted or modified, only completely overwritten with new data (at the end of the storage period). The SFS control system actually contains no Delete command at all. Thus the SFS treats each HDD 2 as if it were a very large (long) tape. As a result the SFS provides for formatting on the fly, thus allowing completely unformatted brand new disks (or even pre-formatted with some other filing system) to be used without any time-consuming formatting procedures.

A number of very useful and advantageous features arise as a result of this approach, including:
1) Optimisation of writing throughput (maximum disk speed);
2) Fast playback of continuous sequences;
3) Minimal movement of read/write arm, thus:
   Lower wear on arm actuator;
   Lower disk operating temperature (actuator using less power);
   Lower vibration (arm & actuator are effectively still most of the time);
4) A more robust data structure due to the absence of a directory;
5) Simple data recovery; and
6) Easy seek for date & time, despite no directory.

Optimisation of Writing Throughput

Since the read/write arm 12 does not have to move constantly back and forth to update a directory, the maximum sustainable throughput of the disk system can be achieved. This is ideal for use within systems within which large amounts of data are generated and required to be recorded in a robust and reliable manner.

Fast Playback

Sequential data recording applications are most likely to be read out (i.e. played back) in sequentially manner. With the SFS, the data are arranged within the HDD 2 in the same strictly sequential manner in which they were generated (i.e. they are not fragmented and in a random block order as with a conventional Disk Filing Systems). Thus the SFS file arrangement is ideally suited for the most common data retrieval requirement, with read-out speed being optimised, as the read/write head 11 does not need to constantly seek back and forwards to reconstruct a full file, or get the next file—it simply stays in position on one cylinder 15 reading out the data within the ABs 19 and tracking slowly across the platters 13 as it moves from the current cylinder to the next.

Even reverse readouts (reverse playback, which is common with video applications) are fast, as the ABs 19 are simply read in reverse order as they spin beneath the read/write head 11, with the head 11 again tracking slowly (backwards this time) as it moves from one cylinder 15 to the previous one.

Minimal Movement of Read/Write Arm

An obvious consequence of the SFS is that the read/write arm 12 does not have to move constantly back and forth between the ABs 19 and a directory. In fact, as we have seen, the arm 12 need only move very slowly indeed as it fills (or reads) all the ABs 19 contained within a cylinder 15 and steps onto the next. This dramatically reduces the energy required to drive the arm 12, resulting in lower heat dissipation and therefore lower operating temperatures.

This advantageous situation is further enhanced by the resultant lower wear and tear on the actuator assembly 10 and the extreme reduction in vibrations (which otherwise would normally be caused by the rapid accelerations and decelerations of the arm 12.

Robust Data Structure

The SFS data structure is highly robust as a direct consequence of its simplicity and sequential ordering. Should areas of the surfaces of the data platters 13 become contaminated or damaged in anyway (by dust, or a head crash, or simply write errors through head inaccuracies caused by vibration or shock), the remaining data are entirely usable. In a conventional system, an entire file would be lost if even a portion of the file lay on one sector 16 which had a damaged area within it. More importantly, SFS is not sensitive to directory errors (which can cause complete loss of data) as there is no requirement for a directory. Thus even with a severely damaged disk (assuming the read/write head was still operational), all data which can still be read remain useful.

Simple Data Recovery

Should a HDD 2 fail, even catastrophically, and specialist data recovery services be required, then the SFS also offers certain additional advantages. Since the data sectors ABs 19 are effectively self-contained, then any undamaged ABs 19 will still be able to be read. Therefore, a useful (if incomplete) data sequence is still able to be reformed from a severely damaged data platter 13.

Easy Seek for Date & Time, Despite No Directory

Employing a master controller board 5 allows for the time span on each HDD 2 to be tracked. Furthermore, as the data are stored in strict sequence on each HDD 2, it is a fairly trivial matter to find a particular time within that time span, even though there is no directory.

Given the start and end times for a particular data platter 13, the system can make a reasonable estimate for the location of the starting point for any required data sequence through a straight-line interpolation. The time stamp and time span of the data within the block at the estimated point is then read from the header sector 20 and then a further, more accurate, estimate made and the time read out from that header sector 20 and so on in an iterative process until the required data are found.

It should be noted that the above data sequence location method holds true even if the stored data are not generated in a strictly continuous manner but is in fact stored in a step-wise continuous manner. For example, some recordings may not be truly continuous in time, but might start and stop according to some external events such as alarm triggers, or the data may vary in volume such as with the frame rate or image quality in video surveillance applications. Such data rate variations or discontinuities will merely result in a slight increase in the seek time (number of seek attempts) required to access the starting point for the required data sequence.

As the read/write arm 12 is capable of moving very quickly, even a seek process which requires many iterative steps will be completed within milliseconds. This is not a problem for data retrieval within the presently described systems 1, 17 or 18, and their intended applications. Furthermore, given the overall system architecture, the data required for playback may in fact be located on a powered-down data disk, thus requiring approximately 5 or 6 seconds to spin up the data disk ready for interrogation. Note however, that once the start point of the required data sequence is found, the data may be streamed out for playback at the maximum read speed of the HDD 2 as, the playback itself will be sequential (even if in reverse).

Hint Index

It has been found to be beneficial to incorporate a hint index 22 at the beginning (or end) of a HDD data storage element. The hint index 22 is a list of the start times (and dates) of each recorded file, the file name and the channel number. The purpose of the hint index 22 is to provide a faster way to locate a particular file by the date, time and channel number.

The hint index 22 is itself sequential in time, and small enough that the entire index can be read into the CPU controller memory extremely quickly, thus searching of the hint index for a particular time and channel is a trivial and fast process. The hint index 22 points to an AB 19 number for the start time of a particular file, and thus the read/write arm can be moved directly to that position and the appropriate file read out. In the presently described system each hint index 22 entry is 32 bytes long, such that there will be 16 entries per sector. As a result the hint index 22 occupies only around 0.0001% of the available space on an HDD 2.

For clarity it should be noted that the hint index 22 is not the same as a directory, as typically employed within prior art systems. There exist several features of the hint index 22 that distinguish it from such directories, including the fact that the hint index 22 is:

Very compact, thus increasing the effective capacity of the data platter 13 (using less than 0.0001% of the disk space, compared with 4-5% used by a conventional directory systems);
Infrequently updated e.g. once every few minutes, or alternatively once every time a pre-determined number of files have been written;
Not essential to the process of locating data sequences; and
Very easily and quickly re-built, if necessary.

The hint index 22 is simply employed as a guide to find any particular data sequence according to a time-stamp as this improves the seek time, especially in the case of playback being requested from many different points within a short space of time.

From the above discussion it can be seen that the SFS further reduces any residual temperature or vibration issues remaining within the previously described data storage systems 1, 17 or 18, while mitigating the increase in power consumption resulting from employing two HDDs 2 at once within the mirrored write data system 18.

By exploiting the SFS, the reliability of the data storage systems 1, 17 or 18 can be improved yet further and the optimum situation achieved for data writing speeds. This method is ideal for digital video recording, digital audio recording, instrumentation recording, data backup, archiving and similar applications where large volumes of data are recorded sequentially and typically only seldom read.

Data Disk Encryption

As the data stored on the HDD 2 is often sensitive or evidential in nature, an encryption system can be added to any of the above described read or write processes. The data disk encryption process is employed at a fundamental and low-level, thus making it independent of any encryption which may or may not be carried out at a higher level (by say a DVR). Various encryption schemes can thus be implemented to provide data security, allowing only authorised persons to read the data for example, or more importantly, to use a machine-generated encryption key to provide a method of securely encoding the data such that data could not be modified or falsified and re-recorded at a later time. The latter scheme would provide for a secure method of identifying where and when the data were written in a manner which could be verified by the manufacturer of the data storage systems 1, 17 or 18.

The above data storage systems therefore provide cheaper, more reliable, more power-efficient and more convenient methods and apparatus for data storage than those described within the prior art. The described data storage systems employ one or more sequential data recording techniques. Such sequential recording is achieved through the sequential employment of arrays of low-cost HDD 2 and/or the sequential employment of individual sectors located within the HDDs 2 themselves.

The foregoing description of the invention has been presented for purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention as defined by the appended claims.

The invention claimed is:

1. A method of storing data on a hard disk drive system, the method comprising the steps of:
   1) selecting a first data storage element comprising m sequentially arranged hard disk drives, wherein m is two or more;
   2) sequentially writing the data simultaneously on each of the m hard disk drives of the first data storage element until the first data storage element is filled to capacity;
   3) selecting a next data storage element of m sequentially arranged hard disk drives;
   4) sequentially writing the data simultaneously on each of the m hard disk drives of the next data storage element until the next data storage element is filled to capacity;
   5) repeating steps 3 and 4 until a predetermined number of data storage elements have been filled to capacity;
   wherein the next data storage element overlaps the previous data storage element by less than m hard disk drives of the previous data storage element.

2. A method as claimed in claim 1 wherein the method further comprises repeating steps 1 to 5 once the predetermined number of data storage elements has been filled to capacity.

3. A method as claimed in claim 1 wherein the data storage elements comprises three sequentially arranged hard disk drives.

4. A method as claimed in claim 3 wherein the next data storage element overlaps the previous data storage element by two of the hard disk drives of the previous data storage element.

5. A method as claimed in claim 1 wherein the method further comprises selecting the sequentially next data storage element in response to failure of a hard disk drive to which data is being written.

6. A method as claimed in claim 1 wherein the step of recording the data within the data storage elements further comprises the step of encrypting the data.

7. A method as claimed in claim 1 wherein the step of sequentially writing data on a hard disk drive comprises the steps of:
- A) selecting a first allocation block from an array of sequentially arranged allocation blocks located within the hard disk drive;
- B) recording data within the first allocation block until the first allocation block is filled to capacity;
- C) selecting a sequentially next allocation block from the array of sequentially arranged allocation blocks;
- D) recording data within the sequentially next allocation block until the sequentially next allocation block is filled to capacity; and
- E) repeating steps C and D until a predetermined number of the sequentially arranged allocation blocks of the array have been filled to capacity.

8. A method as claimed in claim 7 wherein the method further comprises repeating steps A to E once the predetermined number of the sequentially arranged allocation blocks of the array have been filled to capacity.

9. A method as claimed in claim 7 wherein the step of recording data within an allocation block further comprises the step of recording start and end times of the data stored within the allocation block.

10. A hard disk drive system for storing data, the system comprising a plurality of sequentially arranged hard disk drives and a hard disk drive controller operable to:
- 1) select a first data storage element comprising m sequentially arranged hard disk drives, wherein m is two or more;
- 2) sequentially write the data simultaneously on each of the m hard disk drives of the first data storage element until the first data storage element is filled to capacity;
- 3) select a next data storage element of m sequentially arranged hard disk drives;
- 4) sequentially write the data simultaneously on each of the m hard disk drives of the next data storage element until the next data storage element is filled to capacity;
- 5) repeat steps 3 and 4 until a predetermined number of data storage elements have been filled to capacity;
  - wherein the next data storage element overlaps the previous data storage element by less than m hard disk drives of the previous data storage element.

* * * * *